United States Patent [19]

Swetnam et al.

[11] Patent Number: 4,540,054
[45] Date of Patent: Sep. 10, 1985

[54] CULTIVATING ATTACHMENT FOR CROP HARVESTER SUPPORT VEHICLE

[75] Inventors: Larry D. Swetnam; James H. Casada; Linus R. Walton, all of Lexington, Ky.

[73] Assignee: University of Kentucky Research Foundation, Lexington, Ky.

[21] Appl. No.: 496,306

[22] Filed: May 19, 1983

Related U.S. Application Data

[63] Continuation-in-part of Ser. No. 408,232, Aug. 16, 1982, Pat. No. 4,470,242.

[51] Int. Cl.³ .................... A01B 49/00; A01B 63/104
[52] U.S. Cl. .................... 172/292; 172/298; 172/307
[58] Field of Search ............ 172/307, 297, 292, 245, 172/250, 253, 484, 502, 298

[56] References Cited

U.S. PATENT DOCUMENTS

| | | | |
|---|---|---|---|
| 2,693,447 | 11/1954 | Tanke | 172/292 |
| 2,925,871 | 2/1960 | Gillette | 172/307 X |
| 3,312,290 | 4/1967 | Abbott | 172/245 X |
| 3,955,626 | 5/1976 | Taylor | 172/6 |
| 4,280,563 | 7/1981 | Crow | 172/126 |

FOREIGN PATENT DOCUMENTS 1009467 11/1965 United Kingdom ............. 172/292

*Primary Examiner*—Richard J. Johnson
*Attorney, Agent, or Firm*—Birch, Stewart, Kolasch & Birch

[57] ABSTRACT

A cultivator for attachment to a crop harvester including at least one tool frame member with soil tilling tools adjustably mounted relative thereto. A shaft is provided rotatably mounted relative to a support frame of the crop harvester. An actuating member is operatively connected to the shaft and the support frame for selectively imparting rotation to the shaft. A link is operatively, pivotally connected between the tool frame member and the support frame for guiding the frame member and the soil tilling tools between a raised position out of engagement with a ground surface and a lowered position into engagement with the ground surface. A connecting member is operatively connected to the shaft and the frame member for translating rotational motion of the shaft into rotatable, vertical motion of the tool frame member and the soil tilling tools about the link pivotally mounted to the support frame to selectively raise and lower the frame member and the soil tilling tools.

6 Claims, 8 Drawing Figures

CULTIVATING ATTACHMENT FOR CROP HARVESTER SUPPORT VEHICLE

CROSS-REFERENCE TO RELATED APPLICATIONS

This application is a continuation-in-part of copending application Ser. No. 408,232 filed Aug. 16, 1982, now U.S. Pat. No. 4,470,242.

BACKGROUND OF THE INVENTION

1. Field of the Invention

The present invention is directed to a cultivator for a crop harvester. The cultivator is designed to be readily attached to and detached from a crop harvester. In this manner, the crop harvester may be used for cultivation during the growing cycle of a particular crop. Thereafter, the cultivator may be removed from the crop harvester and the crop harvester may be employed to harvest the particular crop.

2. Description of the Background Art

Cultivators are conventionally attached to a farm tractor. A harvesting machine support frame normally cannot be modified to accept the conventional cultivators without a detrimental effect on the functioning of the harvesting equipment. The Abbott Patent, U.S. Pat. No. 3,312,290, discloses a cultivator harness. The cultivator is designed to be attached to the rear of a conventional tractor. The mechanism includes an adjustment frame to adjust the attachment so as to engage or disengage the ground surface.

The Taylor Patent, U.S. Pat. No. 3,955,626, discloses a multi-row vineyard cultivator. The cultivator is designed for use together with very tall grape vines. The cultivator may be raised or lowered relative to the the ground surface.

The Crow Patent, U.S. Pat. No. 4,280,563, discloses a plurality of cultivators used in combination with a planter. The cultivators are attached to a frame mechanism and a hydraulic cylinder is provided to raise or lower the cultivators relative to the ground surface.

SUMMARY AND OBJECTS OF THE INVENTION

It is an object of the present invention to provide a cultivator which may be easily attached to and detached from a crop harvester.

Another object of the present invention is to provide a cultivator operatively connected to a hydraulic system for raising and lowering soil tilling tools out of engagement with and into engagement with a ground surface.

A further object of the present invention is to provide a cultivator which may be attached to a crop harvester without having a detrimental effect on the functioning of the crop harvester.

These and other objects of the present invention are accomplished by providing a cultivator which may be easily attached to and detached from the support frame of a crop harvester without affecting the harvesting function. More particularly, the crop harvester may be a tobacco harvester which includes a cutter head and a stick handling mechanism. During normal operation, the cutter head and stick handling mechanism are operatively connected to the support frame of the crop harvester. The present invention provides a dual function for the crop harvester. Specifically, the cutter head and stick handling mechanism may be removed and the cultivator attached to cultivate the field during the growing cycle of the plants. The cultivating attachments include a plurality of ground-engaging cultivators which are mounted on a frame pivotally connected to the support frame of the crop harvester. A hydraulic pump and cylinder mechanism is provided to raise and lower the cultivator attachment to position the plurality of cultivators into engagement with the ground surface. A spring scratch tooth arrangement is provided adjacent to each of the ground engaging wheels of the tobacco harvester to remove tire tracks from the ground engaging wheels.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
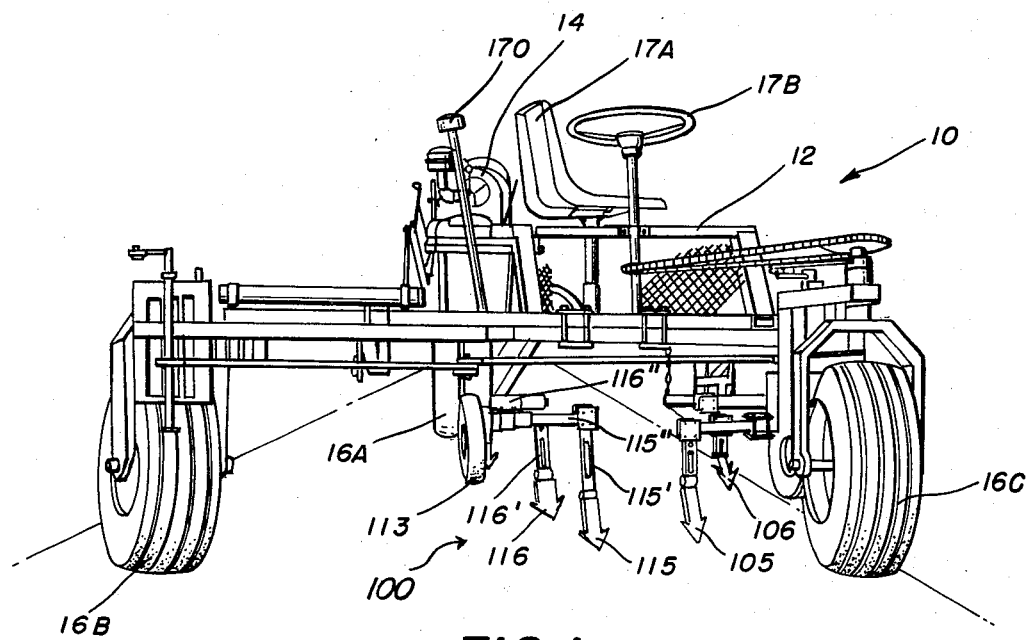
FIG. 1 is a front view illustrating the cultivator attached to a crop harvester.
Figure 2:
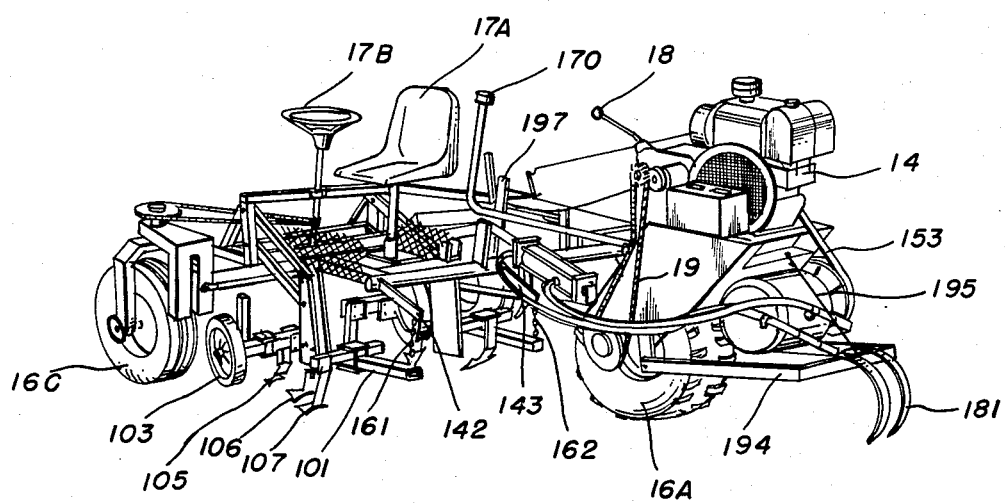
FIG. 2 is a side perspective view illustrating the cultivator attached to a crop harvester.
Figure 3:
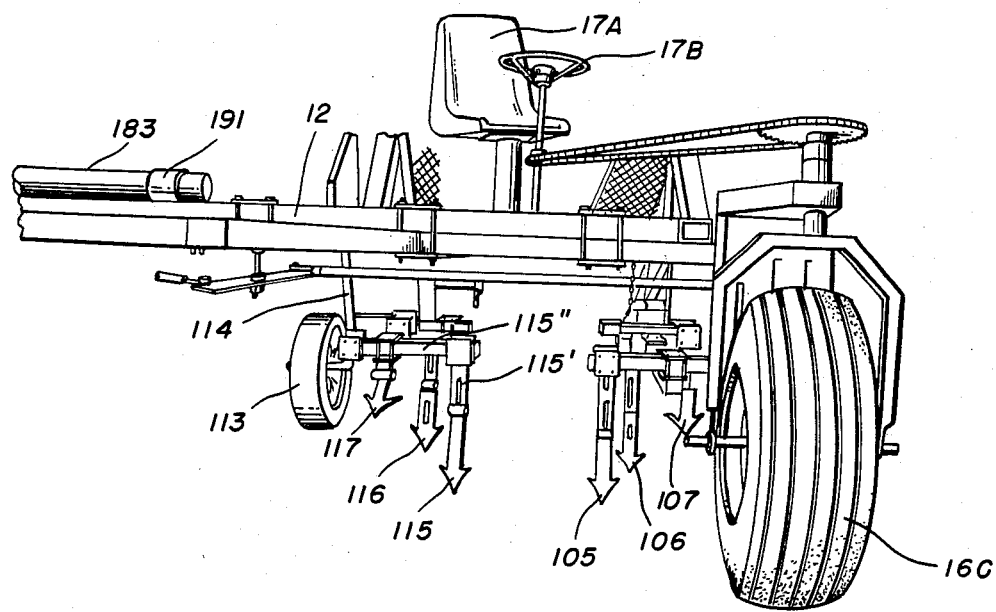
FIG. 3 is a partial front view illustrating the details of the construction of the cultivator attached to a harvester.

As illustrated in FIG. 1, the present invention is directed to a cultivator 100 which is adapted to be attached to a harvesting aid 10. The harvesting aid 10 includes a support frame 12 which is mounted on at least three wheels 16A, 16B and 16C. As illustrated in FIG. 2, the rear wheel 16A is operatively connected to a motor 14 by means of a chain drive 19. A control rod 18 is utilized to control the speed of the motor 14 and the forward movement of the harvesting aid 10. As set forth hereinabove under Summary and Objects of the Invention, the harvesting aid 10 is the self-propelled vehicle which may be attached to a cutter head and stick handling mechanism for harvesting tobacco. However, the harvesting aid 10 is not limited to harvesting tobacco and may be utilized to harvest a plurality of crops.

An operator's seat 17A is positioned on the support frame 12 adjacent to the front end thereof. Positioned in close proximity to the operator's seat 17A is a steering wheel 17B which may be utilized by the operator to steer the harvesting aid 10 onto a row of crops. The control rod 18 is utilized by the operator to control the movement of the harvesting aid 10 with the cultivator 100 attached thereto along a row of crops to cultivate the soil therebetween.

As illustrated in FIGS. 1-3 and 5, the cultivator 100 includes two tool frame members 101, 102. The frame member 101 is operatively connected to a wheel 103 which is mounted on a support 104. Soil tilling tools 105, 106 and 107 are mounted on vertical supports 105', 106' and 107', respectively. The vertical supports 105', 106' and 107' are mounted on horizontal members 105'', 106'' and 107'', respectively. The vertical and horizontal supports are adjustably mounted relative to the frame member 101 to adjust the point of engagement of the soil tilling tools 105, 106 and 107 relative to the ground surface. In addition, the support 104 vertically adjusts the positioning of the wheel 103 to regulate the depth to which the soil tilling tools 105, 106 and 107 enter the ground surface.

The frame 102 includes soil tilling tools 115, 116 and 117 which are mounted on vertical supports 115', 116' and 117'. The vertical supports 115', 116' and 117' are mounted on horizontal support members 115'', 116'' and 117'', respectively. The vertical and horizontal supports adjust the positioning of the soil tilling tools 115, 116 and 117 relative to the ground surface. A wheel 113 is operatively mounted on a support 114. The support 114 adjusts the vertical height of the wheel 113 to regulate the depth to which the soil tilling tools 115, 116 and 117 enter the ground surface.

Figure 6:
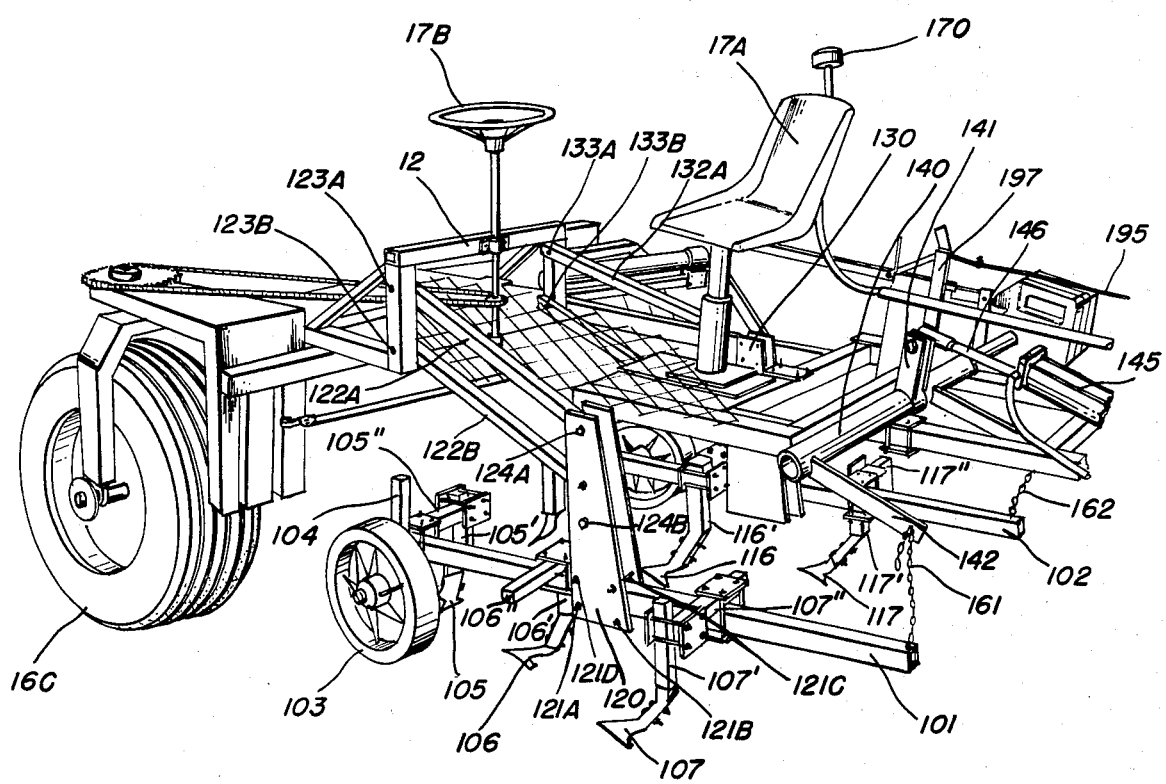
FIG. 6 is a partial perspective view illustrating the details of the cultivator attached to a crop harvester.
Figure 7:
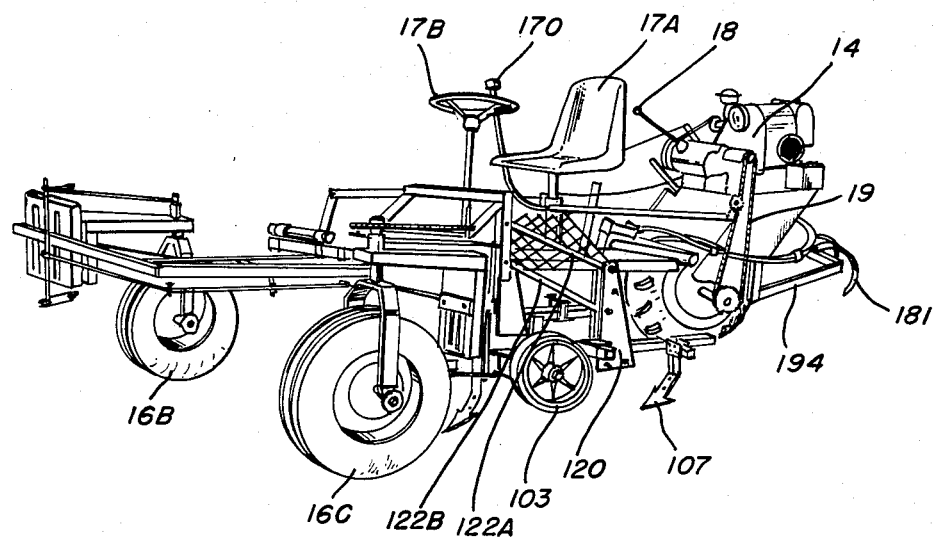
FIG. 7 is a side perspective view illustrating the cultivator attached to a row harvester.

As illustrated in FIGS. 2, 6 and 7, the frame member 101 is connected to the housing 120. Four bolts 121A, 121B, 121C and 121D secure the frame member 101 relative to the housing 120. The housing 120 is connected to links 122A, 122B which are pivotally connected through bearings 123A, 123B to the support frame 12. Similarly, the links 122A, 122B are mounted in bearings 124A, 124B positioned within the housing 120.

Figure 4:
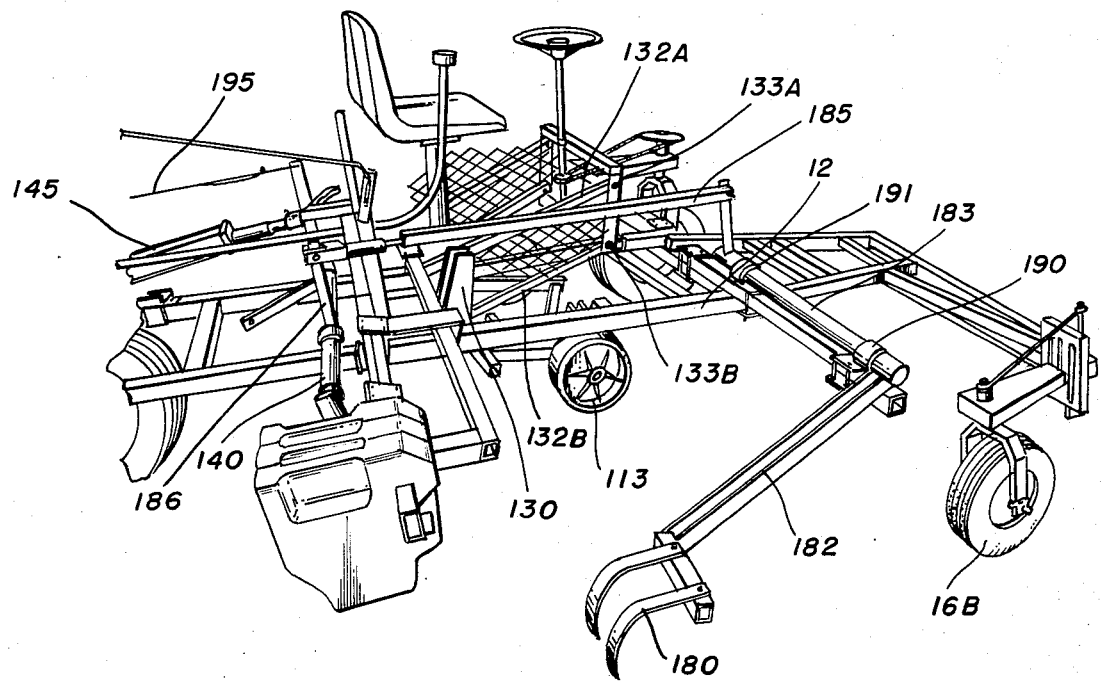
FIG. 4 is a partial perspective view of the right side of a crop harvester partially illustrating the cultivator attached thereto and illustrating a spring toothed scratcher disposed behind the right front wheel of the crop harvester.

Similarly, as illustrated in FIGS. 4 and 6, the frame member 102 is connected to the housing 130. Bolts secure the frame member 102 relative to the housing 130. The housing 130 is connected to links 132A, 132B which are pivotally connected through bearings 133A, 133B to the support frame 12. Similarly, the links 132A, 132B are mounted in bearings positioned within the housing 130.

As illustrated in FIGS. 2 and 6, a shaft 140 is rotatably mounted relative to the support frame 12. The shaft 140 includes an actuator linkage 141. Outwardly projecting linkages 142, 143 are affixed to and project rearwardly from the shaft 140. A hydraulic cylinder 145 includes a piston rod 146 operatively mounted therein. The piston rod 146 is connected to the actuator linkage 141.

Figure 5:
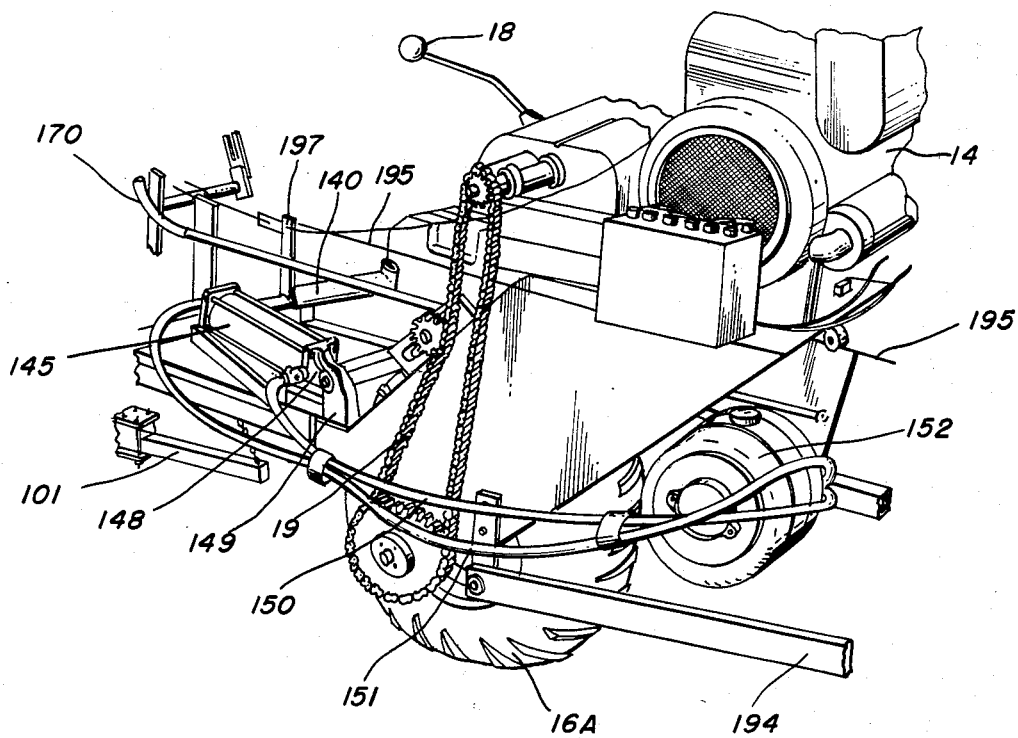
FIG. 5 is a close-up view illustrating the hydraulic pump and cylinder arrangement utilized to raise and lower the cultivator relative to the frame of the crop harvester.

As illustrated in FIGS. 2 and 5, the hydraulic cylinder 145 includes a mounting flange 148 disposed at one end thereof. The mounting flange 148 is rotatably mounted relative to a support flange 149 affixed to the support frame 12. The hydraulic cylinder 145 includes fittings to which hydraulic lines 150, 151 are operatively connected thereto. The hydraulic lines 150, 151 are operatively connected to a hydraulic pump 152. The motor 14 supplies power to the hydraulic pump 152 through a belt 153. The hydraulic pump 152 pressurizes fluid within the hydraulic system to extend or retract the piston rod 146 upon manual actuation of a valve by the operator of the harvesting aid 10.

Upon actuation of the operating valve to supply hydraulic fluid to the hydraulic cylinder 145, the piston rod 146 is extended to impart motion to the actuator linkage 141 which rotates the shaft 140. Rotating the shaft 140 in a counterclockwise direction raises the outwardly projecting linkages 142, 143 which raise the frame members 101, 102 which are operatively connected thereto by means of chains 161, 162. Raising the frame members 101, 102 pivot the soil tilling tools 105, 106 and 107; 115, 116 and 117 about the links 122A, 122B and 132A, 132B. In this manner, the frame members 101, 102 are raised above the ground surface so that the soil tilling tools are elevated above the ground surface.

When hydraulic fluid is supplied to the hydraulic cylinder 145 to retract the piston rod 146, the shaft 140 is rotated in a clockwise direction. Thereafter, the outwardly projecting linkages 142, 143 are lowered so as to lower the frame members 101, 102 which are connected thereto by means of the chains 161, 162. Lowering the frame members 101, 102 pivots the links 122A, 122B and 132A, 132B about the support frame 12 so as to lower the soil tilling tools into engagement with the ground surface. The wheels 103, 113 engage the ground for regulating the depth to which the soil tilling tools enter the ground surface.

The links 122A, 122B and 132A, 132B are arranged in a parallel relationship so as to maintain a level attitude of the soil tilling tools. A single hydraulic pump 152 operatively connected to the hydraulic cylinder 145 is all that is necessary to raise and lower the frame members 101, 102. By moving the valve actuator 170 hydraulic fluid is supplied to the hydraulic cylinder 145 to impart movement to the shaft 140 to cause the frame members 101, 102 to disengage from or engage with the ground surface.

As illustrated in FIGS. 2, 4 and 7, a spring toothed scratcher 180 is positioned behind the right front wheel 16B. Similarly, a spring toothed scratcher 181 is positioned behind the rear wheel 16A. The spring toothed scratcher 180 is mounted on a support arm 182 which is connected to a forward rotatable actuator 183. The forward rotatable actuator 183 includes an upwardly projecting linkage 184 connected to one end thereof. A connecting rod 185 connects the upwardly projecting linkage 184 with an upwardly projecting linkage 186 affixed to the shaft 140. The forward rotatable actuator 183 is rotatably mounted in bearing sleeves 190, 191 which are mounted on the support frame 12.

The rearward spring toothed scratcher 181 is mounted on a support 194 which is pivotally connected to the support frame 12. A cable 195 is threaded through the support frame beneath the motor 14 and is connected to an upwardly projecting linkage 197 connected to the shaft 140. When the hydraulic cylinder 145 retracts the piston rod 146 to rotate the shaft 140 in a clockwise direction, the upwardly projecting linkage 186 is moved to impart movement to the rod 185 which rotates the upwardly projecting linkage 184 in a clockwise direction. Rotating the upwardly projecting linkage 184 in a clockwise direction, with respect to the left side of the crop harvester 10, lowers the arm 182 and the spring toothed scratcher 180 into engagement with the ground surface. Similarly, rotating the shaft 140 in a clockwise direction imparts a clockwise movement to the upwardly projecting linkage 197 which lowers the support 194 to bring the spring toothed scratcher 181 into engagement with the ground surface. Therefore, movement of the rotatable actuator in the clockwise direction lowers all of the soil tilling tools and the spring toothed scratchers into engagement with the ground to be cultivated.

Figure 8:
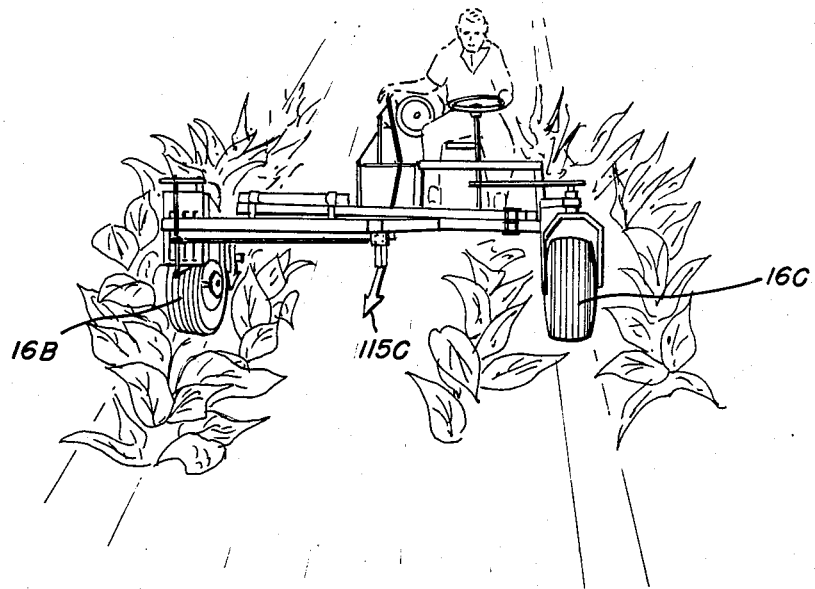
FIG. 8 is a front view illustrating the cultivator attached to a crop harvester being utilized to cultivate between rows of a crop.

As illustrated in FIG. 8, the cultivator for a crop harvester may be utilized to cultivate between the rows of a particular crop. The cultivator illustrated in FIG. 8 is being utilized to cultivate tobacco crops. The front end of the chassis of the crop harvester may be raised by lowering the front wheels in slots provided in the support frame 12. The soil tiling tools 105, 106 and 107 are positioned behind the front wheel 16C to cultivate and remove the track from the left front wheel. The soil tilling tools 115, 116 and 117 are positioned in the central portion of the crop harvester to cultivate the soil disposed between the two front wheels. The spring toothed scratcher 180 is disposed behind the right front wheel 16B to remove the track from the front right wheel. Similarly, the spring toothed scratcher 181 is disposed behind the rear wheel 16A to remove the track of the rear wheel. Thus, no tire tracks are left.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A cultivator for attachment to a motorized crop harvester support vehicle including a pair of longitudinal support frame members, spaced transverse frame members, and at least one steerable wheel comprising:
   a pair of tool frame members;
   soil tilling tools adjustably mounted relative to said tool frame members;
   a first transverse shaft rotatably mounted on the support frame members of the crop harvester support vehicle;
   actuating means operatively connected to said first shaft and said support tool frames for selectively imparting rotation to said shaft;
   a substantially parallel linkage operatively, pivotally connected between said tool frame member and one of said transverse support frame members for guiding said tool frame members and soil tilling tools between a raised position out of engagement with a ground surface and a lowered position into engagement with the ground surface;
   connecting means operatively connected to said shaft and said tool frame members for translating rotational motion of said first frames into rotatable, vertical motion of said tool frame members and said soil tilling tools about said linkage pivotally mounted to said support frame to selectively raise and lower said tool frame members and said soil tilling tools;
   a ground engaging wheel adjustable mounted relative to each of said tool frame members for regulating the depth of penetration of said soil tilling tools;
   a second shaft forwardly mounted on said support frame; and
   a spring toothed scratcher behind said at least one steerable wheel connected to an arm secured to said second shaft, a connecting linkage being operatively connected between said first shaft and said second shaft for imparting rotational motion to said second shaft upon rotation of said first shaft for selectively raising and lowering said spring toothed scratcher in unison with said tool frame members and soil tilling tools.

2. A cultivator according to claim 1, wherein said soil tilling tools are individually mounted on vertical and horizontal supports for vertically and horizontally adjusting each soil tilling tool relative to said frame member.

3. A cultivator according to claim 1, wherein said actuating means includes a hydraulic cylinder with a piston rod extendible and retractable relative thereto, a source of pressurized hydraulic fluid operatively connected to said hydraulic cylinder for selectively extending and retracting said piston rod for selectively imparting rotation to said first shaft.

4. A cultivator according to claim 1, and further including a housing affixed to said at least one frame member and operatively connected to said linkage.

5. A cultivator according to claim 1, wherein said connecting means includes an outwardly projecting linkage connected to said rotatable actuator and an adjustable chain connected to said outwardly projecting linkage and said tool frame member for selectively raising and lowering said tool frame member and said soil tilling tools upon rotation of said first shaft.

6. A cultivator according to claim 1, and further including a second spring toothed scratcher connected to a support linkage operatively connected to said support frame, a cable being affixed to said support linkage and to said first shaft for imparting rotational motion to said support linkage upon rotation of said shaft for selectively raising and lowering said second spring toothed scratcher in unison with said tool frame members and said soil tilling tools.

* * * * *